: 3,501,567
EUGLOBULINIC PROTEIN FRACTION FOR SENSITIZATION OF FIBRINOLYTIC PROENZYMES IN HUMAN BLOOD AND PREPARATION THEREOF FROM HUMAN PLACENTAL TISSUE
Jean Choay, Neuilly-sur-Seine, and Maurice Thely and Edmond G. Vairel, Paris, France, assignors to Laboratoire Choay, Paris, France
No Drawing. Continuation-in-part of applications Ser. No. 304,643, and Ser. No. 304,654, both filed Aug. 26, 1963. This application Jan. 24, 1966, Ser. No. 544,320
Claims priority, application France, Aug. 30, 1962, 908,329; Nov. 30, 1962, 917,205
Int. Cl. A61k *17/00, 25/00*
U.S. Cl. 424—95
4 Claims

ABSTRACT OF THE DISCLOSURE

An extract capable of activiting fibrinolytic proenzymes under conditions when such proenzymes cannot be activated by streptokinase is prepared from the euglobulin fraction from human placental tissue by precipitation of proteins from the fraction from saturated sodium chloride solution followed by controlled lysis of insoluble inactive proteins with alphachymotrypsin to concentrate the active protein fraction. The active agent thus prepared is extremely complex and difficult to analyze and its composition has not as yet been determined. It is characterized by the biochemical properties of activating profibrinolysins under conditions where streptokinase is ineffective and, more importantly, by a rapid and specific lysis of pathological fibrin formations, more particularly thrombi and emboli, without altering the coagulation factors of the blood.

---

This application is a continuation-in-part of applications Ser. No. 304,643 and Ser. No. 304,654 filed on Aug. 26, 1963 and now abandoned. The present invention relates to a process for the preparation of a substance which is lytically active against pathological formations of fibrin and which enables thrombi, emboli and fibrin deposits in the body cavities, arteries and veins to be broken down, without altering the coagulation factors of the blood.

This substance is distinguished in particular by one of its biochemical properties, more espectially in that it is capable of activating fibrinolytic proenzymes present in blood which cannot be directly activated by streptokinase.

It is well known that the fibrinolytic enzyme sometimes found in circulating blood comes from a proenzyme normally present in blood and known under the names of "profibrinolysin" and "plasminogen."

The phenomenon of the activation of this proenzyme can be reproduced both in vitro and in vivo. Thus, by the addition of streptokinase to human blood, for example, the clot that can be formed by the addition of thrombin dissolves rapidly.

It has also been observed that streptokinase does not cause any fibrinolytic activity when it is added to the blood of certain animals, such as ox blood, for example. The addition of human blood renders the blood of these animals sensitive to the action of streptokinase.

It has been observed, furthermore, that if small quantities of human plasma are added to bovine plasminogen, for example, it is possible to convert the latter into plasmin with streptokinase. It would appear, therefore, that human plasma contains a substance that is absent from bovine plasma and seems to act as intermediary between the streptokinase and the molecule of plasminogen itself. Such a substance would seem to be of a protein character, but its existence has not hitherto been demonstrated; moreover, various writers are not yet agreed as to its presence in blood; and it may be that the activation of the fibrinolytic proenzymes contained in the blood of certain animals, such as ox blood, is effected by the human plasminogen itself.

The distinguishing biochemical property of the new substance obtained according to the present invention is accordingly represented by the ability of this substance to sensitize profibrinolysin to the action of such substances as streptokinase for example, in the case of profibrinolysin on which streptokinase has no direct effect.

Profibrinolysin (also known as plasminogen), in point of fact, is activated in fibrinolysin (also known as plasmin). Whereas certain profibrinolysins, and particularly the profibrinolysin of normal human origin, are directly activated by streptokinase, other profibrinolysins are not directly activated by this latter substance; such is the case in particular, with profibrinolysin prepared from the blood of animals slaughtered for food, such as the ox, pig and so on, in which profibrinolysins the activation of the zymogen of the fibrinolytic enzyme can be effected only indirectly with streptokinase, by the introduction of human plasma or according to the present invention, of the substance to which the invention relates. Thus, if one adds streptokinase to a solution of bovine fibrinogen containing profibrinolysin (all the usual preparations of bovine fibrinogen contain profibrinolysin) and brings about coagulation by adding the requisite amount of thrombin, the clot of fibrin obtained is stable and does not break down until a fairly long period (several hours) has elapsed. On the other hand, if one adds to a solution of bovine fibrinogen containing profibrinolysin not only streptokinase, but also the product to which the present invention relates, the clot formed when thrombin is added breaks down rapidly.

The same applies to profibrinolysin coming from human blood which, for pathological reasons, is no more directly activated in fibrinolysin by streptokinase.

The applicants have now found that it is possible to prepare from another, more easily accessible raw material than human blood, the substance capable of activating the fibrinolytic proenzyme present in blood, which makes up the object of the present invention.

The present invention has for its object a process for the preparation of a substance able to activate the fibrinolytic proenzyme present in blood, which process comprises the extraction of a fraction rich in said substance, from human placentas which are first treated by a mild extraction medium, the product of said extraction being then subjected to the action of a salt-free medium, in slightly acid pH conditions, which brings about the precipitation of the euglobulins contained in the aforementioned extraction medium, the remaining solution, which constitutes the aforementioned fraction rich in said substance, being then purified by means of salting-out agents.

According to a preferred embodiment of the process according to the present invention, the mild extraction medium by means of which the extraction of the fraction rich in the substance sought after human placentas, is carried out, is a stabilizing medium such as an acid glycerised medium.

According to another preferred embodiment of the process according to the present invention, a fraction rich in a substance able to activate the fibrinolytic proenzymes present in blood is obtained by first subjecting human placentas to freezing at the lowest temperatures possible and preferably below −10° C., the frozen placentas then being steeped in an aqueous liquid medium, in the presence of a stabiliser such as glycerine, with an acid pH indication of less than, or at most equal to, pH 5, in temperature conditions in the vicinity of 0° C.; then to adjustment of the pH value so as to alkalinise the liquid fraction, which alone has been retained following the steeping process, and to cause precipitation of the impurities, that is to say substances containing inhibitors and coloured substances, which are eliminated; then to treatment with a saturated solution of sodium chloride, after adjustment of the pH value so as to acidify the medium, this treatment causing precipitation of the whole of the proteins; then to treatment for separating the salts contained in the protein precipitate—by dialysis, for example, to obtain a non-ionised solution; then to slight acidification of the medium, preferably to a pH value of between 5 and 6, to cause precipitation of the euglobulins; then to treatment for purifying the euglobulin precipitate, previously dissolved in an acid medium, with a saturated solution of magnesium sulphate, which precipitates the impurities; and finally to a further addition of a saturated solution of sodium chloride, which brings down the protein fraction rich in the substance required.

In one advantageous application of the process proposed in the invention, the protein fraction obtained by the process is suitably treated with a proteolytic enzyme such as alpha-chymotrypsin, for example, which hydrolyses the inactive insoluble proteins present in the said fraction and renders them soluble, the action of the proteolytic enzyme being controlled so as not to destroy the activity of the substance it is desired to prepare.

Another purpose of the invention is to establish a process for activating fibrinolytic proenzymes such as, in particular, profibrinolysin, when these enzymes cannot be directly activated by such substances as streptokinase, the distinguishing feature of this process being the addition to these fibrinolytic proenzymes, to which a substance of the streptokinase type has been added, of a fraction rich in the substance capable of activating these proenzymes, prepared as already described, the effect of which is to make possible the activation of the fibrinolytic proenzymes by substances such as streptokinase in particular, with a view to their conversion into fibrinolysin.

The present invention has also for its purpose a new substance which is characterized by the aforementioned process by which it is obtained, by its biochemical property of activating profibrinolysins present in blood which cannot be directly activated by streptokinase, in fibrinolysin, and by its lytic activity on pathological fibrin formations and particularly on thrombi and emboli.

The present invention has also for its object the use of the new substance obtained according to the aforementioned process, as a new medicament for the lysis treatment of pathological fibrin formations, and particularly of arterial and veinous thromboses and embolisms and for the treatment of fibrinous deposits in general cavities and channels of the organism.

The present invention has also for its object the use of the new medicament intravenously.

In addition to the objects just described, the invention includes other objects which will be clear from the description which follows.

The invention relates more particularly to processes for preparing a substance capable of activating the fibrinolytic proenzymes present in blood, and to said substance as well as to processes for activating fibrinolytic proenzymes such as profibrinolysin, according to the present invention; it also relates to the elements required for realizing and carrying out these processes, as well as general processes which include said processes for preparing a substance capable of activating the fibrinolytic proenzymes present in blood and for activating profibrinolysin in fibrinolysin.

The invention will be more readily understood from the following supplementary description, in which will be found examples of the application of the process for preparing a substance capable of activating the fibrinolytic proenzymes present in blood and of the process for activating fibrinolytic proenzymes such as profibrinolysin, as proposed in the invention.

It should be understood, however, that these examples are given solely by way of illustration and in no wise imply any limitation of the scope of the invention.

EXAMPLE I

A quantity of 50 kg. of frozen human placentas is pulped as finely as possible in that condition, after which the following are added to it:

Glycerine—75 litres
Distilled water—425 litres
Sodium chloride—3 kg.
Hydrochloric acid, quantity sufficient to adjust the pH value to pH 1.5 after cooling the additions to 0° C.

The steeping is continued, accompanied by continuous agitation, at a temperature in the vicinity of 0° C. and on no account exceeding +4° C., for 12 hours, care being taken to keep the pH-value below 2 by the addition, if need be, of hydrochloric acid. The insoluble fraction is separated by filtration in a filter-press previously cooled by circulation at +2° C. To the clear liquid, collected in a cooled receptacle, soda is added, to bring the pH-value to 8.7. The temperature is maintained at between 0° C. and 4° C. for 2 hours, during which time a precipitate is formed, which is eliminated by continuous centrifuging. As the clear residual liquid arrives in a cooled receiver, the pH-value is reduced to 3 by the addition of concentrated hydrochloric acid. When the whole of the clear liquid has reached the said receiver, one volume of a saturated solution of sodium chloride is added, the pH-value of this added solution having been adjusted to 3 with the aid of hydrochloric acid. This addition is accompanied by constant agitation, the temperature being maintained at about 0° C. The precipitate formed is separated by filtration in a filter-press and re-dissolved, still at pH 3 and cold, in water, to give a volume equal to one-quarter of the original volume. One and one-half volumes of ethyl alcohol previously chilled to −15° C. is then added. The temperature must be maintained at between 0° C. and −5° C., once the addition of alcohol has been completed. The precipitate, collected rapidly by centrifuging in a cooled system, is washed once with 75° GL ethyl alcohol and chilled to a temperature of −5° C., mainly for the purpose of eliminating most of the sodium chloride adsorbed on the precipitate. The precipitate, freed as far as possible from its alcohol, is quickly brought under vacuum to evaporate the alcohol off completely, at as low a temperature as possible, which must not rise above 0° C. The dry product is pulverised, dissolved in water and brought to a pH-value of 3 with the aid of hydrochloric acid, to give a 5% solution by volume. Keeping the temperature at about 5° C., one slowly adds a saturated solution of magnesium sulphate, so as to obtain finally a 15% saturation. The precipitate formed is at once separated by filtration over Chardin paper, then washed in a 15% saturated solution of magnesium sulphate with a pH-value of 3. One volume of a saturated solution of sodium chloride is added to the filtrate and washing liquor. The precipitate is collected by centrifuging, dialysed against running water, cooled and adjusted to pH 3. The dialysed solution is brought to pH 5.4 and left to stand for six hours at a temperature of between 2° C. and 6° C. The precipitate obtained is separated by being centrifuged cold and then dissolved in 2 litres of 15% acetic acid. This acetic solution is put into a 6-litre decanting flask and to it is added 2 kg. of ethyl ether. It is shaken several times and the aqueous layer is separated and shaken up again with ether, until the ether no longer discolours. One volume of a saturated solution of sodium chloride adjusted to pH 3 is then added to the aqueous solution and the precipitate is separated by centrifuging cold. The precipitate is dialysed, then dispersed. The resulting substance is soluble in an acid medium of pH-value less than 4.5 and in an alkaline medium with pH-value more than 8.

EXAMPLE II

A quantity of 50 kg. of human placentas, freed from the adjacent tissues and washed in distilled water and preserved frozen at as low a temperature as possible (in any case below −10° C.), is pulped in the frozen state and extracted, while being constantly agitated with 500 litres of the following mixture:

Distilled water—250 litres
Glycerine—250 litres
Sodium chloride—3 kg.
Hydrochloric acid, quantity sufficient to adjust the pH-volume to pH 1.6

Throughout the extraction process, the temperature must be maintained round about 0° C. Constant agitation is maintained during the two hours steeping, the pH-value being watched, and if necessary hydrochloric acid is added to bring this to between 1.8 and 2.

The solid fraction is separated by continuous centrifuging in a cooled machine, then extracted again in the same way as above, with 200 litres of water/glycerine/sodium chloride/acid mixture in the proportions already mentioned.

After separation of the solid fraction, the first extract and the washing liquor are mixed and one volume of a saturated solution of sodium chloride already chilled to 0° C. is added. The precipitate formed is collected at once by filtration in the filter-press and dissolved in a mixture of 80 litres of distilled water and 20 litres of glycerine. The pH-value is adjusted to 9 by the addition of soda and the temperature is kept between 0° C. and 4° C.

The precipitate formed is separated as rapidly as possible, by centrifuging in a cooled machine. The clear residual liqiud is acidified as it is collected, with the aid of hydrochloric acid, to bring it to pH 3. The solid fraction is emptied into 25 litres of glycerised water (20% by volume) and brought to pH 9 by the addition of soda. The washing liquor is added to the first extract after centrifuging, after which, with agitation constantly maintained and the temperature kept between 2° C. and 4° C. and the pH-value at 3, two volumes of a saturated solution of sodium chloride are added slowly. The precipitate formed is recovered by filtration and put back into solution in 50 litres of distilled water at pH 3, the temperature still being maintained at about 4° C. One volume of a saturated solution of sodium chloride is added, to free the precipitate completely of glycerine. The precipitate is dissolved in 200 litres of water, if necessary with the aid of hydrochloric acid. The solution must be absolutely clear before being brought to pH 5.3 with soda. It is left to stand for 18 hours, with its temperature kept the whole time at about +4° C., its pH-value being 5.3. The precipitate formed is recovered by filtration and returned to 5 litres of 5% acetic acid, then diluted three times with its own volume of sulphuric ether. One volume of a saturated solution of sodium chloride is added to the aqueous fraction and the pH-value is adjusted to 3 by the use of hydrochloric acid. The precipitate formed is collected by filtration, put back into solution in water and dialysed against base-exchanged water cooled to +4° C. To the dialysed solution is added a sufficient quantity of a saturated solution of magnesium sulphate to give 15% saturation. This is left to stand for 3 hours at +4° C. and the precipitate is separated by filtration. Next, the precipitate is washed in half a volume of a 15% saturated solution of magnesium sulphate. The washing liquor and filtrate are mixed, then one volume of a saturated solution of sodium chloride is added, after adjustment of the pH-value to 3 with hydrochloric acid. The precipitate is separated immediately by centrifuging and returned to solution in a minimum quantity of distilled water and dialysed against base-exchanged water cooled to +4° C. The pH-value of the dialysis product is adjusted with soda to 8. The temperature is raised to 30° C. and 25 mg. of crystallised alpha-chymotrypsin is added, constant agitation being maintained, the pH-value being kept at 8 by the addition of ordinary soda as hydrolysis develops. The hydrolysis is stopped, by acidification to pH 3 with hydrochloric acid, as soon as the solution ceases to precipitate when brought to pH 7. One volume of sodium chloride saturation is then added, the precipitate being collected immediately by centrifuging cold and returned to solution in 2 litres of water, 2 volumes of ethyl alcohol chilled to −2° C. being added. This solution must be made slowly and the temperature of the water/alcohol mixture must never rise above 0° C. The precipitate is recovered rapidly by centrifuging carried out at a temperature below 0° C. The precipitate is next placed under high vacuum to eliminate the alcohol, then put back into 10 litres of distilled water and the pH-value is adjusted to 5.3 by the addition of soda, after which the medium is left to stand for 24 hours at +4° C. The precipitate is then collected by centrifuging cold and put back into solution in distilled water, if necessary with the aid of hydrochloric acid, after which the solution obtained is dispersed. The substance so obtained is soluble in an acid medium of pH-value less than 5; it is also soluble at pH 7 and above.

EXAMPLE III

A quantity of 50 kg. of human placentas, freed from the adjacent tissues and washed in distilled water and preserved frozen at as low a temperature as possible (in any case below −10° C.), is pulped in the frozen state and extracted, while being constantly agitated, with 1,050 litres of the following mixture:

Distilled water—900 litres
Glycerine—150 litres
Sodium chloride—6.300 kg.
Hydrochloric acid, quantity sufficient to adjust the pH-value to pH 1.6

Throughout the extraction process, the temperature must be maintained round about 0° C. Constant agitation is maintained during the two hours' steeping, the pH-value being watched, and if necessary hydrochloric acid is added to bring this to between 1.8 and 2.

The solid fraction is separated by filtration in a filter-press previously cooled by circulation at +2° C. To the clear solution is added 5 kg. of filtration additive (Clarcel), then it is adjusted to pH 8.9 and the light precipitation adsorbed on the additive is separated by filtration in a filter-press previously cooled by the passage of distilled water at +4° C. The clear filtrate, as it is collected, is acidified with hydrochloric acid to bring it to pH 3. A saturated solution of magnesium sulphate is then added slowly to the medium, to bring the final concentration to 20% saturation at 0° C. The medium having been allowed to stand for 2 hours, the precipitate formed is separated by filtration and to the clear filtrate is added its own volume of a saturated solution of sodium chloride. The resulting precipitate is separated by filtration and dried under high vacuum, care being taken to see that the temperature does not exceed 20° C. The dry product thus obtained is pulverised and placed in suspension, with continuous agitation, in 20 litres of ethyl alcohol of 70° GL, a temperature of +5° C. being maintained. After one hour's agitation, the precipitate is separated from the alcohol by filtration in a surrounding temperature cooled to +5° C., and this operation is repeated in the same way with the same volume of alcohol, the object being to eliminate as far as ever possible the sodium chloride that is mixed with the precipitate. The alcohol is evaporated in vacuo and the resultant product is returned to 100 litres of distilled water, cooled to +4° C. and adjusted to pH 5.3. At the end of 18 hours, during which time the temperature has been maintained at between +4° C. and +6° C., the precipitate is separated by filtration, returned to 3 litres of 5% acetic acid and shaken up with its own volume of ethyl ether, this process being repeated until the etherised floating fraction is no longer coloured. One volume of a saturated solution of sodium chloride is then added to the acetic solution and the precipitate formed is immediately collected by centrifuging and cooled, after which it is put back into solution in distilled water. It is dialysed against cold running de-ionised water, then frozen and dispersed.

The substance capable of activating the fibrinolytic proenzymes present in blood, obtained by the process proposed in the invention, is a slightly coloured or white substance, which is soluble in water and in isotonic solutes having a pH value below 4 or above 7, soluble in alcoholic solutions of a strength of less than 45° GL, and can be precipitated from its aqueous solutions by certain mineral salts, such as a 0.5 saturated solution of sodium chloride in an acid medium.

As it has the general properties of proteins, it gives positive responses to biuret and to Millon's Reaction. In the present state of research, its structure is not yet known; it is stable when dry and it is more stable, when in solution, in an acid than in an alkaline medium and also more when cold than when hot.

Since the structure of the substance capable of activating the fibrinolytic proenzymes present in blood is not known at present, the only identifying properties as yet available for this compound are its method of preparation, the one aforementioned of its biochemical properties and its lytic activity upon pathological formation of fibrin.

The example which follow illustrates an application of the invention in which a bovine profibrinolysin that cannot be directly activated with a substance of the streptokinase type is activated with the aid of the substance capable of activating fibrinolytic proenzymes, obtained by the process to which the present invention relates.

EXAMPLE IV

The activation of bovine profibrinolysin is undertaken as follows. The substance obtained by the process proposed in the invention is placed in a number of tubes, which are brought to 37° C. in a water-bath. The streptokinase and thrombin are added, as well as the bovine fibrinogen prepared by a method ensuring that is contains bovine profibrnolysin. One then observes the breakdown of the clot of fibrin formed, which takes place after a time which depends on the quantities of the different substances involved. Should the addition of the substance obtained by the process proposed in the invention be omitted, the breakdown of the clot formed will be observed only after a considerable time (several hours).

Series 1

Using the substance obtained by the process described in Example I above, the following times of breakdown of the clot of fibrin formed are obtained, for the quantities indicated below:

Streptokinase—125 units (trade name "Varidase," Lederle), Thrombin—0.12 mg.
Bovine fibrinogen (containing profibrinolysin)—1 ml. of of solution of 1 mg. per ml.

| Substance, $\mu$g.: | Breakdown time |
|---|---|
| 0.33 | 30'55" |
| 0.66 | 18'35" |
| 1.32 | 12'35" |
| 1.98 | 10'40" |

Series 2

Using the substance obtained by the process described in Example II above, the following times of breakdown of the clot of fibrin formed are obtained, for the quantities of substance indicated below, the quantities of the other constituents being identical to those set out above:

| Substance, $\mu$g.: | Breakdown time |
|---|---|
| 0.5 | 22'35" |
| 1 | 16'25" |
| 2 | 11'35" |
| 3 | 9'55" |

The complete biochemical defibrination of ox plasma is possible by this method of activation.

STUDY OF THE PHARMACOLOGICAL PROPERTIES OF THE NEW MEDICAMENT TO WHICH THE INVENTION RELATES

The lytic activity of the medicament to which the invention relates, against pathological formations of fibrin and especially against thrombi and emboli, has been demonstrated by carrying out experiments with dogs in which acute arterial obstructions have been experimentally produced, such as pulmonary embolisms, for example.

(1) Action of the medicament on pulmonary embolism in the dog

The experiment is conducted on dogs weighing between 10 and 15 kg., anaesthetized to unconsciousness with pentothal and intubed. One of the pulmonary arteries is catheterised from the external jugular vein under radioscopic control.

The experiment takes place in two stages:

Creation of a pulmonary embolism,
Application of the medicament.

(a) *Creation of a pulmonary embolism.*—To create the pulmonary embolism one uses a clot prepared in vitro from the blood of the dog upon which the experiment is being conducted. It is thus possible to control the volume of the clot injected, say to between 10 and 15 cm.³, and to prepare a hard non-friable embolus.

The clot is introduced by means of the catheter, thus making it possible to disregard one of the two branches of the pulmonary artery and to avoid killing the dog with a massive pulmonary embolism. In this way one obtains partial and selective pulmonary embolisms which can be controlled by angiocardiography. Moreover the clot thus injected through the probe is localised in one of the branches of the pulmonary artery.

Testing of the embolism is effected by means of selective angio-cardiographs made through the probe before the admission of the clot, after the embolism and after treatment.

(b) *Application of the medicament.*—The medicament is administered either intravenously or by means of the pulmonary catheter so as to place the medicament in direct contact with the clot.

The doses of medicament used are injected once only, 10 to 15 minutes after the injection of the clot, and amount to between 10,000 and 15,000 experimental thrombolytic units; the experimental thrombolytic unit introduced by the applicants in the present patent application may be regarded as the quantity of medicament capable of determining in 10 minutes the lysis of the standard clot prepared as described above.

The activity of the medicament is evaluated after 30 to 60 minutes. The effectiveness of the medicament has been verified by carrying out radiographic tests by new selective angiocardiographs intended to demonstrate the re-permeabilisation of the pulmonary artery.

(c) *The results.*—The dogs involved in the experiment were divided into two groups.

A first group of eight dogs constituting a check or control group.

A second group of 17 dogs which received the medicament.

With regard to the 17 dogs of the second group, in 12 cases a complete re-permeabilisation of the pulmonary artery was found, with no trace of the clot in the vascular lumen.

In five cases a clot was found in the axis of the canal; the clot did not obstruct the canal to any extent but projected into certain branches of the pulmonary artery.

An angiocardiograph of the dogs of the check or control group shows the absence of the spontaneous lysis of the clot.

In the case of the five dogs in which lysis of the clot was only partial, angiocardiography shows that the medicament in accordance with the invention acts initially on the periphery of the clot, creating between the residue of the latter and the vascular wall, a channel which allows the blood to pass once more; this blood acts as a medium for the medicament which then exerts on the clot a lateral action capable of effecting the ultimate total lysis of the clot.

(d) *Lysis tests.*—Tests effected during or after administration of the medicament reveal no modification in coagulation time, thrombin time or in the time for spontaneous lysis of the clot at 37°, when compared with the results of these tests effected before the administering of the medicament.

(2) Action of the medicament on the acute obstruction of a peripheral artery (a) *Technique for creating an acute arterial obstruction.*—Dogs weighing between 10 and 20 kg. and anesthetized to unconsciousness with pentothal were given acute arterial obstructions in the following manner:

a clot is made in vitro with the blood of the dog which is the subject of the experiment. The clot thus formed is injected into the artery to be obliterated.

The injected clot is either a new clot, prepared during the previous 15 to 30 minutes, or an old clot made 24 to 48 hours in advance.

In all cases the same quantity of clot (10 cm.$^3$) is injected.

The clot was injected into the common femoral artery. The femoral artery was exposed from the ligamentum inquinale to the middle of the thigh. A cord was tied, not too tightly, around the lower part of the superficial femoral so as to create a stenosis to retain the clot.

The injection of the clot was made by way of a collateral branch.

(b) *Application of the medicament.*—The medicament was administered intravenously in a dose of between 10,000 and 15,000 experimental thrombolytic units, depending on the weight of the dog. No other medicament was injected at that time.

Radiological tests were effected by injecting an iodized product into the artery, not at an excessive pressure, the safety valve represented by the main arterial channel upstream from the clot being left free in all cases. Thus there was no risk of the clot being repelled.

Radiological tests were made:

before the injection of the clot, in order to inspect the disposition of the arterial arbor of the dog being studied, after the injection of the clot, in order to control its position at the level of the arterial stenosis, finally, and later, to study the action of the medicament.

(c) *The results.*—Twenty dogs were subjected to this experiment. The first group comprised seven check or control animals which consequently were not injected with the medicament. In these seven dogs radiological tests showed that the thrombosis persisted and even grew rapidly.

The second group consisted of seven dogs, each of which was injected with a new clot. The effect of the medicament was observed for a relatively short time, between one and two hours.

At the end of this time there was complete lysis of the clot in five cases, partial lysis in two cases; but in every case the radiological tests showed that the permeability of the arteries has been restored.

For the third group, consisting of six dogs, clots between 24 and 48 hours old were used. The medicament according to the invention was administered every six hours for 24 to 48 hours.

In two cases, lysis of the clot was complete.

In two cases it was uncomplete but re-permeabilisation of the arteries was effected and was demonstrated by radiological study.

In two cases, the medicament had no effect.

(d) *Lysis tests.*—Tests effected during or after administration of the medicament reveal no modification in coagulation time, thrombin time or in the time for spontaneous lysis of the clot at 37° C., when compared with the results of these tests effected before the administering of the medicament.

(e) *Conclusion.*—These experiments show that the medicament has an indisputable effect on new clots; this is evidenced by the re-permeabilisation of the canals, as demonstrated by radiological examination.

These results have been obtained by treatments of short duration, between one hour and two hours. The effect of the medicament on older clots is positive but less reliable. The results of the experiments permit one to think that in the case of the animmal one may hope for lysis of the clot up to the forty-eight hour, without inducing any modification in the blood coagulation factors.

In the course of studying the pharmacological properties of the medicament according to this invention, no phenomenon of intolerance or toxicity has been observed; in particular the medicament according to the invention, injected into dogs, rabbits and rats in therapeutic doses over three months, has produced no detectable toxic effect. A study of acute toxicity has not permitted the determination of DL50.

RESULTS OF CLINICAL EXPERIMENTS INVOLVING THE USE OF THE NEW MEDICAMENT ACCORDING TO THE INVENTION

There normaly exists systems in equilibrium which control coagulation and lysis. In certain patients this equilibrium is disturbed and these disturbances lead to the intravascular formation of resistant thrombi; the product obtained by the process described in the above mentioned patent application and constituting the medicament of the present invention, effects the lysis of pathological fibrin formations and particularly the lysis of thrombi and emboli which may be present in the blood of these patients.

Clinical tests on human beings have very clearly demonstrated the curative action of the novel medicament according to the present invention on arterial embolisms and on arterial and venous thromboses.

(I) ADMINISTRATION OF THE MEDICAMENT AND CONTROL OF ITS EFFECT

The medicament was injected intravenously, directly and discontinuously. In some cases the local duct, arterial or venous, was also employed in acute arterial thromboses, for such a method of administration makes it possible to create a greater concentration of the medicament in situ.

Control was effected by confirming the disappearance of the clinical symptoms of thrombosis, arterial or venous. Moreover with certain patients it was possible to make angiographs before and during the treatment in order to study the effect, on the thrombosis, of the novel medicament according to the present invention.

In none of the patients has there been revealed any change in coagulation factors or factors of fibrinogen lysis. In particular, the following tests: coagulation time, thrombin time, time of spontaneous lysis of the whole clot and of euglobulins, remained unchanged, whether effected during and after the treatment by the medicament of the invention, when compared with the results of tests effected before the administration of the medicament.

(II) ACUTE PHLEBITIS

Example 1

A patient 28 years of age and having plebitis of the lower left limb as a result of child bearing. She has a very extensive edema of the lower left limb as well as coloration of the teguments.

There is spontaneous pain at calf level, the pain being exacerbated by active flexure of the toes.

*Treatment.*—The patient receives intravenously 5000 experimental thrombolytic units of the medicament, six times a day for four days.

*Immediate results.*—During the first 48 hours of the treatment one notes the regression of the edema and the disappearance of the pain.

*Long term results.*—Re-examined 45 days after completion of the treatment, this patient had neither edema nor pain, and her walk was normal.

Example 2

A patient 65 years old and having a superficial plebitis of the internal saphera. This patient has a venous thrombosis over varicous dilation of the internal saphena vein.

*Treatment.*—5000 units of the medicament, every six hours for four days, into the general intravenous passage, and 5000 units, once a day, into the local venous passage.

*Immediate results.*—With effect from the third day, progressive regression of the volume of the thrombosed varicous bundle, initially at calf level and then progressively to the level of the internal saphena.

The immediate functional result is satisfactory.

*Long term results.*—The patient was re-examined a month after completion of the treatment. There was no sign of superficial phlebitis, and in particular there was no secondary edema.

(III) ACUTE ARTERIAL THROMBOSES

Example 1

A 61 year old patient having an acute arterial obstruction of the lower right limb, the obstruction having developed four days previously.

Before treatment with the medicament, the foot, leg and lower third of the thigh are cyanosed, the femoral pulse is imperceptible.

*Treatment.*—On the first, second and third days the patient receives 5000 units of the medicament every six hours, on the fourth day, 5000 units every four hours; and on the fifth and sixth days, 10,000 units every four hours.

*Immediate results.*—A significant improvement is noticed in the first two days, with the calf becoming warm again and progressively resuming a normal colour; spontaneous movements are possible at foot and toe level.

*Long term results.*—Re-examined two months after completion of the treatment, the patient can walk. There is no apparent pain in the effort. It is noted, however, that at the level of the teguments of the posterior face of the calf there persists a slight cyanosis with cooling.

Example 2

A patient 57 years of age having an acute arterial obstruction of the lower left limb, the obstruction having developed suddenly 48 hours before the commencement of the treatment. The foot and the lower half of the leg are cold and cyanosed. The pedial pulse and posterior tibual are imperceptible. The arterial oscillations are suppressed from the lower third of the thigh.

*Treatment.*—The patient is given, to the exclusion of all other therapy, 10,000 units to the medicament according to the invention every six hours for four days.

*Immediate results.*—In the thirty-sixth hour of the treatment the foot and leg warmup again and the cyanosis regresses. At the completion of the treatment, the temperature of the teguments and the colour are the same on both sides. The pedial pulse and posterior tibual are again detectable. The arterial oscillations re-appear.

*Long term results.*—Two months after completion of the treatment there is practically no sequal to the acute arterial obstruction.

Example 3

Patient 70 years old has an acute thrombosis of the central artery of the retina.

*Treatment.*—The patient receives 5000 units of the medicament every six hours for four days.

*Immediate results.*—In the forty-eighth hour of the treatment, an increased visual acuity is confirmed.

*Long term results.*—At the end of the treatment the improvement persists and the patient sees again with his bad eye. This improvement is again seen one month after the completion of the treatment.

(IV) ARTERIAL EMBOLISM

Example 1

Patient, 49 years old, having an embolism of the lower left limb.

This illness occurred in a patient with an old mitralitis. There was a syndrome of ischemia of the lower left limb. Arterial pulsations were not perceptible at the popliteal, pedial and posterior tibial arteries. There were no arterial oscillations from the upper third of the calf.

Arteriography showed a stoppage of the embolism type at the level of the superficial femoral in the upper part of the popliteal hollow.

*Treatment.*—The patient received 5000 units of the medicament every three hours for four days.

*Immediate results.*—From the forty-eighth hour the arterial pulsations again became detectable, at the popliteal artery as well as at the posterior tibial and pedial arteries. Arterial oscillations were again discovered in the upper third and middle third of the left calf.

*Long term results.*—Clinical imrovement continued for a month after the treatment finished.

Example 2

A patient of 40 years of age having a mitral tenosis and a hemiplegia with aphasia by an embolism of a cerebral artery.

*Treatment.*—The patient is given 5000 units of the medicament every four hours for four days.

*Immediate results.*—From the forty-eighth hour the clinical symptoms of the hemiplegia recede and the aphascis disappears.

*Long term results.*—At the end of the treatment there are practically no symptoms of hemiplegia. The cure is still effective three months after completion of the treatment.

(V) ACUTE OBSTRUCTIONS OF FEMORO-POPLITEAL OR ILIO-POPLITEAL BRIDGING

Example 1

Patient, 45 years old, had three months earlier suffered a femoro-popliteal bridge for chronic arterial obstruction. Acute obstruction of the bridge—syndrome of acute ischemia.

*Treatment.*—The patient received 5000 units of the medicament every four hours for four days.

*Results.*—On completion of this treatment the syndrome of acute obstruction had regressed and arteriography showed the re-permeabilisation of the bridge.

*Long term results.*—The patient was re-examined three months later and the cure was found still to be effective.

Example 2

Patient, 50 years old, having an ilio-popliteal bridge for chronic arterial obstruction of the common femoral. Obstruction of the bridge; syndrome of ischemia of the lower limb.

*Treatment.*—The patient received 10,000 units of the medicament every six hours for five days.

*Immediate results.*—With effect from the third day, the dyndrome of obstruction regressed. After the treatment, circulation in the limb was normal.

*Long term results.*—This cure was still effective three months after completion of the treatment.

(VI) PATHOLOGICAL FIBRIN FORMATIONS

Example 1

Obstruction of the lacrimal canal by a fibrinous pustule.

Intra-canal injection of 1000 units of the medicament every two days. Deobstruction is effected on the eighth day.

Example 2

A man, 25 years old, has painful symptoms of a sero-fibrinous pleurisy. Pleuroscopy shows that the two layers of the pleura are joined together by fibrin deposits in the form of velamer and cordage.

*Treatment.*—Intrapleural injection of 5000 units of the medicament twice a week for one month.

*Immediate results.*—Disappearance of pain.

*Long term results.*—A test pleuroscopy taken two months after completion of the treatment shows almost total disappearance of the fibrin deposits.

It will be appreciated that these examples are given solely by way of illustration of the invention and do not in any way constitute a limitation thereof.

Moreover, the invention is in no way limited to the methods of application or production which have been more particularly described above; on the contrary, it covers all variations thereof, without departing from the scope of the invention.

It follows from what has been said above that the new medicament obtained according to the invention presents the advantage, over previously known medicaments for the resorption of blood clots, that it permits the physiological lysis of pathological fibrin formations, and particularly the lysis of thrombi and emboli without modifying the blood coagulation factors.

What we claim is:

1. A process for the preparation of an euglobulinic protein fraction capable of sensitizing fibrinolytic proenzymes in blood which comprises freezing human placental tissue; steeping said frozen tissue at a temperature of about 0° C. in an aqueous medium containing glycerine and having a pH not exceeding 5; separating the liquid extract portion from the thus-treated placental tissue; adjusting the pH of the said extract to alkalinize the same, thereby precipitating impurities comprising inhibitors and colored substances; removing said impurities by filtration; treating the resulting filtrate with acid to adjust the pH thereof to 2.5–3 and admixing the acidified filtrate with an equal volume of saturated sodium chloride solution thereby precipitating proteins therefrom; dialyzing the protein precipitate to separate salt therefrom, raising the pH of the resulting non-ionized solution to about 6 thereby precipitating euglobulins; dissolving the euglobulin precipitate in an acid medium at a pH of about 3; precipitating impurities from said acid solution by adding thereto a saturated solution of magnesium sulfate; separating the said impurities from the liquid fraction; precipitating the protein fraction rich in the substance capable of activating fibrinolytic proenzymes by addition of saturated solution of sodium chloride, and recovering said protein fraction.

2. The protein fraction of human placentas produced by the method of claim 1.

3. A process according to claim 1 whereby the protein fraction is treated with a proteolytic enzyme such as alpha-chymotrypsin, to hydrolyse the insoluble inactive proteins present in the said fraction, rendering them soluble, and inactivating the proteolytic enzyme when a precipitate no longer forms at a pH of 7.

4. A pharmaceutical composition for lysis treatment of pathological fibrin formations containing a therapeutically effective concentration of the protein fraction according to claim 2 in a therapeutically acceptacle vehicle.

No references cited.

ELBERT L. ROBERTS, Primary Examiner